US006631228B2

United States Patent
Gao et al.

(10) Patent No.: US 6,631,228 B2
(45) Date of Patent: Oct. 7, 2003

(54) ADHESIVE-FREE BONDING METHOD OF FIBER ATTACHMENT FOR POLYMER OPTICAL WAVEGUIDE ON POLYMER SUBSTRATE

(75) Inventors: Renyuan Gao, Strafford, PA (US); Anthony F. Garito, Radnor, PA (US)

(73) Assignee: Photon-X, Inc., Malvern, PA (US)

( * ) Notice: Subject to any disclaimer, the term of this patent is extended or adjusted under 35 U.S.C. 154(b) by 0 days.

(21) Appl. No.: 10/238,763

(22) Filed: Sep. 10, 2002

(65) Prior Publication Data

US 2003/0053757 A1 Mar. 20, 2003

Related U.S. Application Data

(60) Provisional application No. 60/322,163, filed on Sep. 14, 2001.

(51) Int. Cl.[7] .................................................. G02B 6/30
(52) U.S. Cl. ............................. 385/49; 385/40; 385/50; 385/88
(58) Field of Search ............................. 385/49, 89, 40, 385/50, 88, 2, 16

(56) References Cited

U.S. PATENT DOCUMENTS

| | | | |
|---|---|---|---|
| 3,953,620 A | | 4/1976 | Chandross et al. |
| 4,475,790 A | | 10/1984 | Little |
| 4,744,619 A | * | 5/1988 | Cameron ..................... 385/52 |
| 4,838,634 A | | 6/1989 | Bennion et al. |
| 4,867,524 A | | 9/1989 | Courtney et al. |
| 4,883,743 A | | 11/1989 | Booth et al. |
| 4,976,506 A | * | 12/1990 | Pavlath ......................... 385/14 |
| 5,073,002 A | * | 12/1991 | Hockaday ..................... 385/49 |
| 5,142,605 A | | 8/1992 | Diemeer et al. |
| 5,297,228 A | | 3/1994 | Yanagawa et al. |
| 5,533,156 A | | 7/1996 | Maxwell et al. |
| 5,533,158 A | | 7/1996 | Han et al. |
| 5,548,673 A | | 8/1996 | Kitamura et al. |
| 5,671,316 A | | 9/1997 | Yuhara et al. |
| 5,682,453 A | | 10/1997 | Daniel et al. |
| 5,687,267 A | | 11/1997 | Uchida |
| 5,949,932 A | | 9/1999 | Lawrenz-Stolz |
| 6,097,871 A | | 8/2000 | De Dobbelaere et al. |
| 6,144,795 A | | 11/2000 | Dawes et al. |
| 6,160,945 A | | 12/2000 | Rhee et al. |
| 6,212,320 B1 | | 4/2001 | Rickman et al. |
| 6,229,949 B1 | | 5/2001 | Ido et al. |
| 2002/0025122 A1 | * | 2/2002 | Ouchi et al. .................. 385/88 |

* cited by examiner

Primary Examiner—Hemang Sanghavi
Assistant Examiner—Eric Wong
(74) Attorney, Agent, or Firm—Joseph E. Maenner; Monte & McGraw, P.C.

(57) ABSTRACT

An optical waveguide assembly is disclosed. The optical waveguide assembly includes having a substrate face, a cladding disposed on the substrate, and a waveguide core disposed within the cladding. The waveguide core has a waveguide core face such that the waveguide core face is aligned with the substrate face. The assembly further comprises a fiber support assembly having a support face in contact with the substrate face and a fiber having a fiber core face optically aligned with the waveguide core face. Non-adhesive means fixedly connects the substrate face to the support face. A method of non-adhesively bonding an optical waveguide to a fiber support is also disclosed.

16 Claims, 3 Drawing Sheets

ADHESIVE-FREE BONDING METHOD OF FIBER ATTACHMENT FOR POLYMER OPTICAL WAVEGUIDE ON POLYMER SUBSTRATE

CROSS REFERENCE TO RELATED APPLICATIONS

This application claims priority from U.S. Provisional Patent Application Ser. No. 60/322,163, filed Sep. 14, 2001.

BACKGROUND OF THE INVENTION

Optical telecommunications networks use light transmitted along an optical path between a transmitter and a receiver to transmit light signals at high rates of speed over generally long distances. Typically, the optical path is comprised of optical fiber with a multitude of different types of optical devices disposed along the optical path to perform different functions in the network. The optical fiber generally consists of a core, which guides the light signal, and a surrounding cladding, which retains the light signal in the core through total internal reflection. The optical devices must be connected to and optically aligned with ends of the optical fiber in order to properly transmit the light signals. Increasingly, the optical devices are in the form of planar optical waveguides.

Planar optical waveguides can be formed by using various materials, such as polymers, glasses, semiconductors, and composite materials as the core and surrounding cladding material, with the core material having a refractive index slightly higher than that of the cladding material in the near infrared region of the optical telecommunication wavelength window. Various optical devices, such as integrated splitters, couplers, arrayed waveguide gratings, and optical waveguide amplifiers can be formed with planar optical waveguides. In order to insert optical waveguide devices into optical fiber communication networks, it is essential to have the capability to connect optical fibers to waveguides.

Currently available technology for connecting optical fibers to planar optical waveguides uses adhesive bonding, such as epoxy, combined with precision alignment before and during the bonding process. With long exposure to signal light and environmental effects, the adhesive in the optical path between the fiber and the waveguide can suffer, resulting in increased optical absorption and scattering induced performance degradation.

In a typical prior art method of fiber attachment to a planar optical waveguide, a pre-made fiber attachment subassembly constructed of fiber optic capillary tubes or silicon V-groove arrays is polished at an endface that will be attached to an optical waveguide. The optical waveguide is diced and polished at its endface prior to attachment with the fiber attachment subassembly. The fiber attachment subassembly and the optical waveguide chip are positioned on a six-degrees-of-freedom precision alignment station. After fine mechanical adjustment of the fiber attachment subassembly with the waveguide that produces maximum translational and rotational alignment between the core of the optical fiber and the core of the optical waveguide, an adhesive, such as epoxy, is dispensed between the optical fiber attachment subassembly and the waveguide. The adhesive subsequently undergoes curing, such as by ultra-violet light exposure or thermal treatment, which fixes the relative positioning between the fiber on the fiber attachment subassembly and the waveguide. Due to the fact that single mode optical fiber cores and single mode optical waveguide cores have dimensions in the order of micrometers, the alignment tolerance to achieve acceptable level of optical loss between thr fiber and the waveguide is on the submicron level. Further, as the adhesive between the fiber and the waveguide is being cured, in-situ readjustment of the alignment between the optical fiber and the optical waveguide is often required because of adhesive volume shrinkage-induced alignment change.

It would be beneficial to provide a process for attaching an optical fiber attachment subassembly with a planar optical waveguide without the need for an adhesive and without the need for in-situ adjustment of alignment during the attachment process.

BRIEF SUMMARY OF THE INVENTION

Briefly, the present invention provides an optical waveguide assembly comprising an optical waveguide having a substrate having a substrate face, a cladding disposed on the substrate, and a waveguide core disposed within the cladding. The waveguide core has a waveguide core face such that the waveguide core face is aligned with the substrate face. The assembly further comprises a fiber support assembly having a support face in contact with the substrate face and a fiber having a fiber core optically aligned with the waveguide core face. Non-adhesive means fixedly connects the substrate face to the support face.

Further, the present invention provides a method of connecting an optical waveguide to an optical fiber support. The method comprises providing an optical waveguide having a substrate, wherein the substrate has a substrate face; providing an optical fiber support having a support face; applying non-adhesive means to at least one of the support face and the substrate face; and contacting the support face and the substrate face.

The present invention further provides a method of connecting an optical waveguide to an optical fiber support. The method comprises providing an optical waveguide having a substrate, wherein the substrate has a substrate face; providing an optical fiber support having a support face; providing a bonding plate having a first portion and a second portion; applying non-adhesive means to at least one of the first portion and the substrate; applying the non-adhesive means to at least one of the second portion and the support; and contacting the first portion to the substrate and contacting the second portion to the support such that the substrate face and the support face are contacting each other.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain the features of the invention. In the drawings.

DETAILED DESCRIPTION OF THE INVENTION

Figure 1:
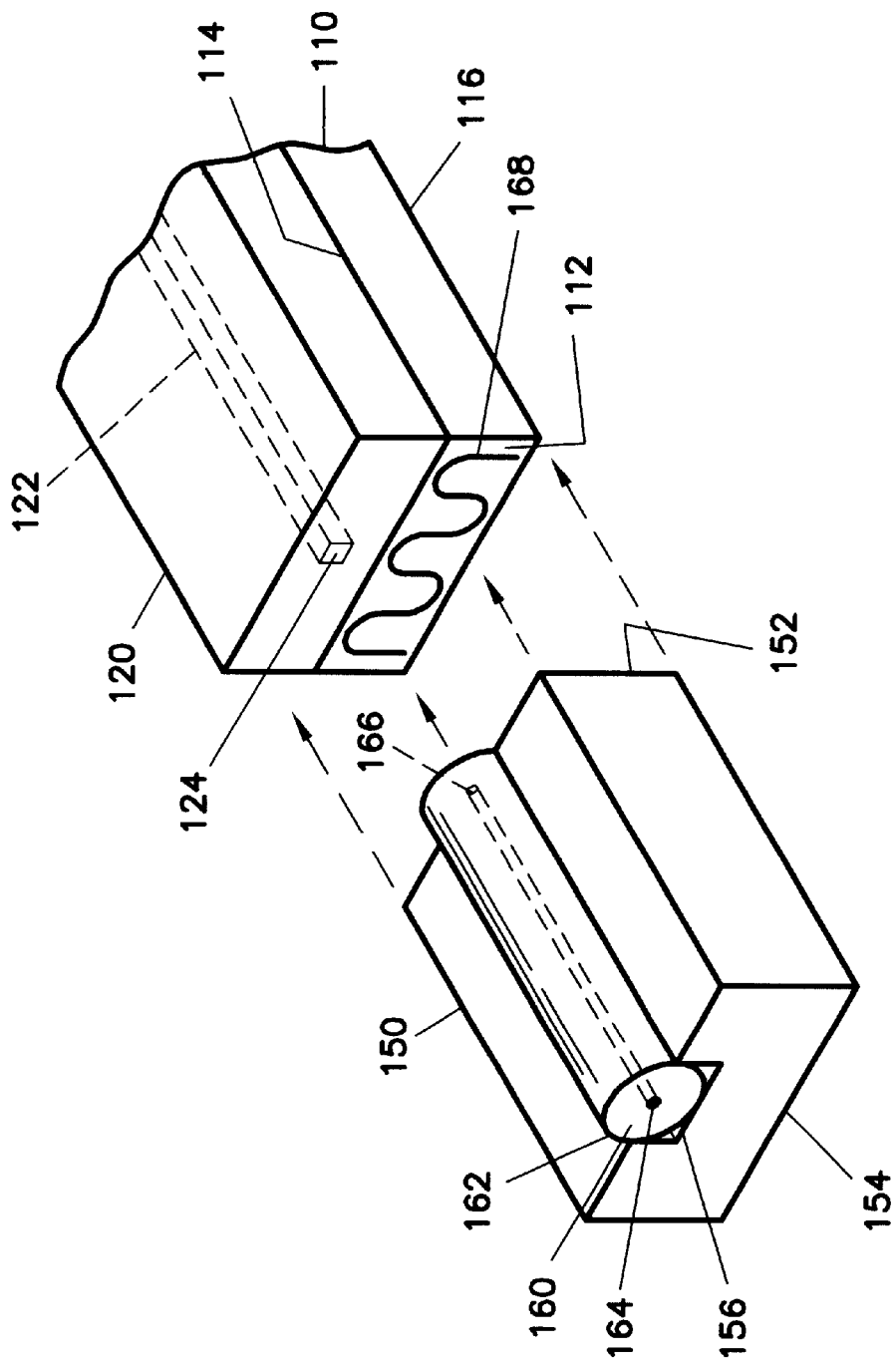
FIG. 1 is a perspective view of a planar optical waveguide being attached to an optical fiber attachment subassembly according to a first embodiment of the present invention.

In the drawings, like numerals indicate like elements throughout. Certain terminology is used herein for convenience only and is not to be taken as a limitation on the present invention. As used herein, when two elements are "optically aligned" or "in optical alignment", a light signal can be passed between the two elements. The following describes preferred embodiments of the present invention.

Figure 2:
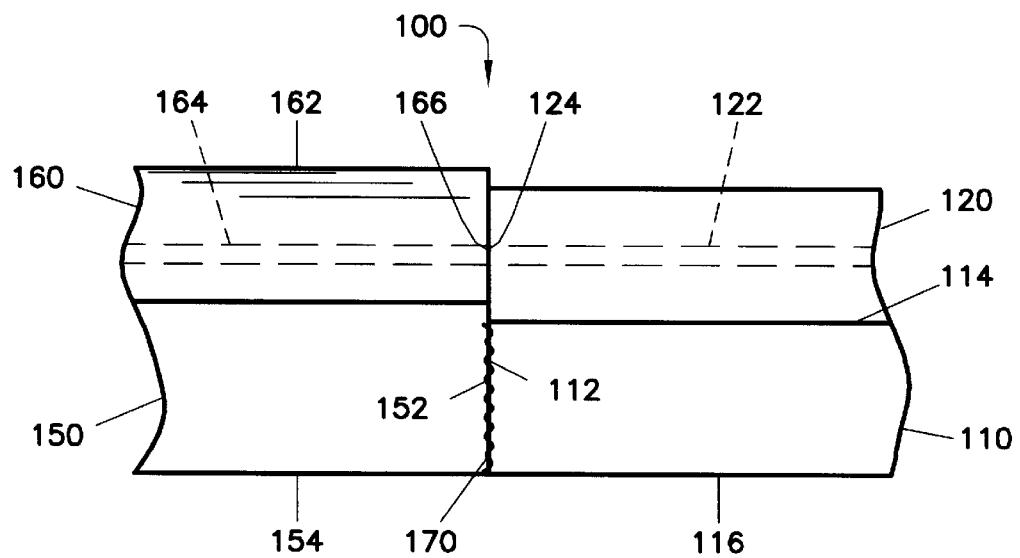
FIG. 2 is a side view of the planar optical waveguide and optical fiber attachment subassembly of FIG. 1 after attachment.

Referring to FIGS. 1 and 2, a method for connecting an optical waveguide assembly 100 and a fiber support assembly 150 according to a first embodiment of the present invention is shown. The optical waveguide assembly 100 is comprised of a substrate 110 with an optical waveguide 120 disposed on the substrate 110.

The substrate 110 can be constructed from any of a polymer, glass, semiconductor, composite material, or metal. The waveguide 120 is comprised of a cladding 122 and a waveguide core 124 disposed within the cladding 122. Preferably, the cladding 122 and the waveguide core 124 are each constructed from a polymer, and more preferably, halogenated polymers, and most preferably, fluorinated polymers. Although polymers are preferred, those skilled in the art will recognize that other materials, including inorganic glass, semiconductor, metal, or composite material can also be used.

Preferably, for a polymer substrate, the substrate 110 is from the group consisting of polycarbonate, acrylic, polymethyl methacrylate, cellulosic, thermoplastic elastomer, ethylene butyl acrylate, ethylene vinyl alcohol, ethylene tetrafluoroethylene, fluorinated ethylene propylene, polyetherimide, polyethersulfone, polyetheretherketone, polyperfluoroalkoxyethylene, nylon, polybenzimidazole, polyester, polyethylene, polynorbornene, polyimide, polystyrene, polysulfone, polyvinyl chloride, polyvinylidene fluoride, ABS polymers, polyacrylonitrile butadiene styrene, acetal copolymer, poly[2,2-bistrifluoromethyl1-4,5-difluoro-1,3-dioxole-co-tetrafluoroethylene] (sold under the trademark TEFLON® AF), poly[2,3-(perfluoroalkenyl) perfluorotetrahydrofuran] (sold under the trademark CYTOP®), poly[2,2,4-trifluoro-5-trifluoromethoxy-1,3-dioxole-co-tetrafluoroethylene] (sold under the trademark HYFLON®), and any other thermoplastic polymers; and thermoset polymers, such as diallyl phthalate, epoxy, furan, phenolic, thermoset polyester, polyurethane, and vinyl ester. However, those skilled in the art will recognize that a blend of at least two of the polymers listed above, or other polymers, can be used. It is also preferred that the substrate 110 has a CTE of approximately between 50 and 300 parts per million per degree Celsius.

The substrate 110 can also be constructed from various glasses, such as silicate, alumino-silicate, or soda lime glasses. The substrate 110 can also be constructed from various semiconductors, such as silicon, germanium gallium-arsenide, indium-phosphide, or other known semiconductor materials. Alternatively, the substrate 110 can be constructed from various metals, such as aluminum, copper, titanium, or alloys of various metals.

As shown in FIG. 1, the substrate 110 has an endface 112. The endface 112 is generally planar and is preferably perpendicular to a top surface 114 and a bottom surface 116 of the substrate 110. However, those skilled in the art will recognize that the endface 112 need not necessarily be perpendicular to either of the top or bottom surfaces 114, 116. Further, the waveguide core 122 has a waveguide core face 124 not covered by the cladding 120, which is generally coplanar with the endface 112 of the substrate 110.

The optical fiber attachment subassembly 150 is used to provide a solid platform for an optical fiber 160 to be optically aligned with the core 122 of the optical waveguide 100. Preferably, the optical fiber attachment subassembly 150 is constructed from the same or a similar material as the substrate 110, so that thermal and other environmental effects do not disturb the relation between the substrate 110 and the optical fiber attachment subassembly 150 after attachment.

The optical fiber attachment subassembly 150 includes a generally planar endface 152, which is preferably angled at a complementary angle to that of the substrate endface 112, so that the subassembly endface 152 can be butted against the substrate endface 112 and form a stable engagement between the two endfaces 112, 152 when the endfaces 112, 152 are contacted together, as will be described in more detail later herein.

The optical fiber attachment subassembly 150 further includes a bottom surface 154 and a fiber channel 156 disposed generally distal from the bottom surface 154. The fiber channel 156 is sized to allow the optical fiber 160 to be disposed within the channel 156 with little or no slack between the fiber channel 156 and the optical fiber 160. As shown in FIGS. 1 and 2, a portion of the fiber 160 can extend beyond the channel 156.

The optical fiber 160 includes a cladding 162 and a fiber core 164, which is generally surrounded by the cladding 162. The core fiber 164 includes a fiber core face 166, which is preferably generally coplanar with the endface 152 of the optical fiber attachment subassembly 150.

One method of manufacturing the optical fiber attachment subassembly 150 for supporting the optical fiber 160 is disclosed in U.S. Provisional Patent Application Serial No. 60/382,414, filed May 21, 2002 (Attorney Docket No. PHX-0079), which is incorporated herein by reference in its entirety. However, this method is not meant to be limiting, as those skilled in the art will recognize other methods of manufacturing the optical fiber attachment subassembly 150.

Prior to bonding the waveguide 100 to the optical fiber subassembly 150, the waveguide core face 124 is optically aligned with the fiber core face 166. This alignment can be performed according to any method known to those skilled in the art.

To bond the substrate 110 to the optical fiber attachment subassembly 150, a solvent 168 is applied to at least one of the endface 112 of the substrate 110 and the endface 152 of the subassembly 150. As shown in FIG. 1, the solvent 168 is applied to the endface 112 of the substrate 110, although those skilled in the art will recognize that the solvent 168 can be alternatively/also applied to the endface 152 of the subassembly 150. Preferably, the solvent 168 can be at least one of cyclohexanone, methylene chloride, methyl ethyl ketone, trichloroethylene, or any combination of these solvents. Further, those skilled in the art will recognize that other solvents suitable for bonding polymer materials may be used. Referring to FIG. 2, the solvent 168 dissolves and softens an interfacial layer at the endface 112 of the substrate and at the endface 152 of the optical fiber attachment subassembly 150, merging the endfaces 112, 152 with each other, forming a monolithic bond 170. After the solvent 168 evaporates, the monolithic bond 170 formed between the optical fiber attachment subassembly 150 and the substrate 110 results in an adhesive-flee attachment of a polymer waveguide on a polymer substrate 110 to a polymer optical fiber attachment subassembly 150.

Alternatively, instead of using the solvent 168, other methods of forming an adhesive-free bond between the endface 112 of the substrate 110 and the endface 152 of the fiber attachment subassembly 150 can include localized ultrasonic or laser heating, where the surface at the endfaces 112, 152 melts and merges, forming the monolithic bond 170. In this process, the endfaces 112, 152 are first aligned and butted up against each other so that the waveguide core face 124 is optically aligned with the fiber core face 166. Ultrasonic or laser energy is then applied at the interface.

Figure 4:
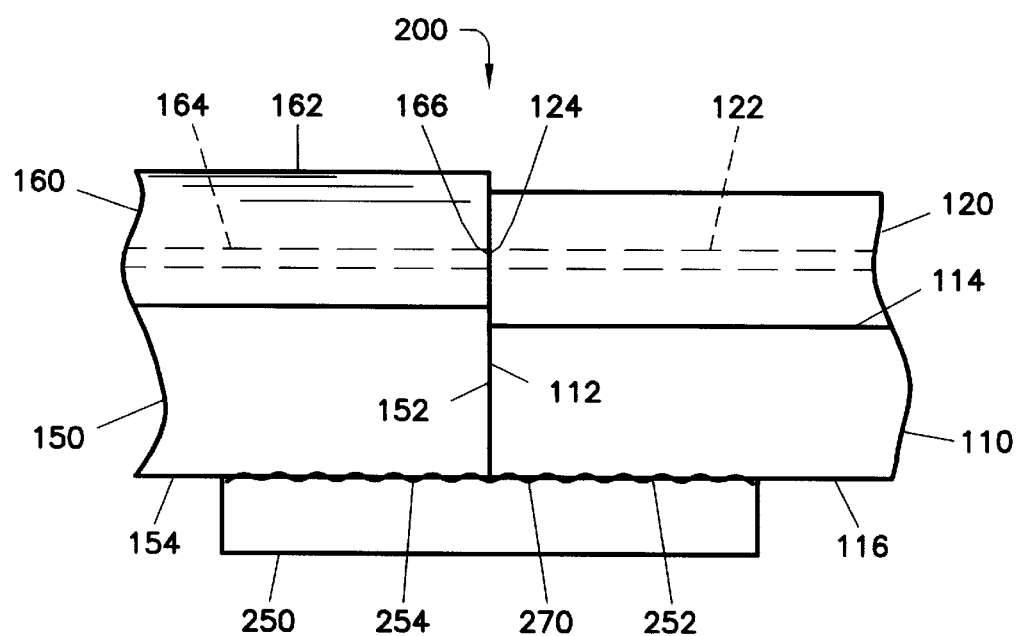
FIG. 4 is a side view of the planar optical waveguide and the optical fiber attachment subassembly of FIG. 3 after attachment.
Figure 3:
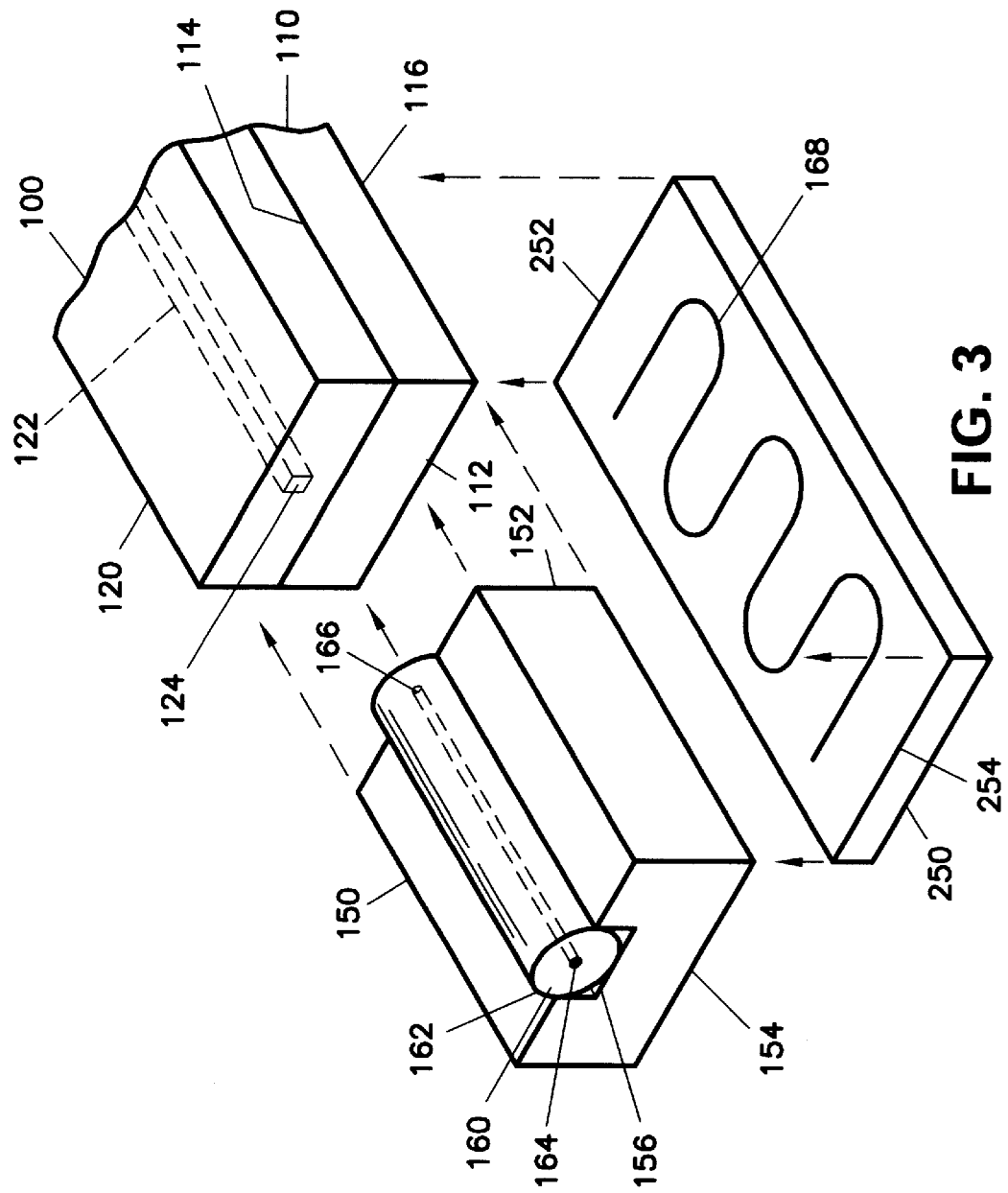
FIG. 3 is a perspective view of a planar optical waveguide being attached to an optical fiber attachment subassembly according to a second embodiment of the present invention.

An alternative embodiment of the present invention is shown in FIGS. 3 and 4. The same waveguide 100 and optical fiber subassembly 150 described above and shown in FIGS. 1 and 2 are used, with the addition of a bonding support plate 250, shown in FIGS. 3 and 4. Preferably, the bonding support plate 250 is constructed from the same material as either or both of the substrate 110 and the optical fiber subassembly 150. The bonding support plate 250 has a first portion 252 which is bonded to the bottom surface 116 of the substrate 110 and a second portion 254, which is bonded to the bottom surface 154 of the optical fiber attachment subassembly 150.

Referring to FIG. 4, the solvent 168 dissolves and softens thin layers at the first and second portions 252, 254 of the bonding support plate 250 and the bottom surface 116 of the substrate 110 and the bottom surface 154 of the optical fiber attachment subassembly 150, merging the bottom surfaces 116, 254 with the first and second portions 252, 254, respectively, forming a monolithic bond 270. After the solvent 168 evaporates, the monolithic bond 270 formed between the optical fiber attachment subassembly 150 and the substrate 110 results in an adhesive-free attachment of a polymer waveguide on a polymer substrate 110 to a polymer optical fiber subassembly 150. The method described herein with respect to the second embodiment keeps the solvent 168 away from the cores 122, 164, reducing the risk of damaging the waveguide core face 124 and the fiber core face 166 with the solvent 168. Further, the bonding support plate 250 provides additional strength to the combined waveguide 100 and optical fiber subassembly 150.

Although, as shown in FIG. 4, the solvent 168 is applied to the first and second portions 252, 254 of the bonding support plate 250, those skilled in the art will recognize that the solvent 168 can alternatively/also be applied to the substrate 110 and the fiber attachment subassembly 150. Further, although FIG. 4 shows the bonding support plate 250 attached to the bottom of the substrate 110 and the optical fiber subassembly 150, those skilled in the art will recognize that the bonding support plate 250 can be connected to the sides of the substrate 110 and the optical fiber subassembly 150.

As with the first embodiment, alternatively, instead of using the solvent 168, other methods of forming an adhesive free bond between the substrate 110 and the fiber attachment subassembly 150 include using localized ultrasonic or laser heating, where the first and second portions 252, 254 of the bonding support plate 250 and the bottom surfaces 116, 154 of the substrate 110 and the fiber attachment subassembly 150 melt and merge, forming the monolithic bond 270.

Further, although not shown, those skilled in the art will recognize that a combination of the first and second embodiments of the present invention can be used, with the solvent, ultrasonic heating, laser heating, or whatever method used to bond the waveguide 100 and the fiber attachment subassembly 150, by applying the method to both the endfaces 112, 152 and th the bottom surfaces 116, 154, with the bonding support plate 250.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An optical waveguide assembly comprising:
   an optical waveguide having:
      a substrate having a substrate face;
      a cladding disposed on the substrate; and
         a waveguide core disposed within the cladding, wherein the waveguide core has a waveguide core face such that the core face is aligned with the substrate face;
   a fiber support assembly having
      a support face in contact with the substrate face; and
      a fiber having a fiber core face optically aligned with the waveguide core face; and
   a solvent disposed between the substrate face and the support face for fixedly connecting the substrate face to the support face.

2. The optical waveguide assembly according to claim 1, wherein the substrate is a polymer.

3. The optical waveguide assembly according to claim 1, wherein the substrate is an inorganic glass.

4. The optical waveguide assembly according to claim 1, wherein the substrate is a semiconductor.

5. The optical waveguide assembly according to claim 1, wherein the substrate is a metal.

6. The optical waveguide assembly according to claim 1, wherein the substrate is a composite material.

7. An optical waveguide assembly comprising:
   an optical waveguide having:
      a substrate having a substrate face;
      a cladding disposed on the substrate; and
         a waveguide core disposed within the cladding, wherein the waveguide core has a waveguide core face such that the core face is aligned with the substrate face;
   a fiber support assembly having
      a support face in contact with the substrate face; and
   a fiber having a fiber core face optically aligned with the waveguide core face; and
   non-adhesive means for fixedly connecting the substrate face to the support face, wherein the non-adhesive means comprises a bonding plate having a first portion fixedly connected to the substrate and a second portion fixedly connected to the fiber support assembly.

8. The optical waveguide assembly according to claim 7, wherein the non-adhesive means comprises a solvent disposed between the bonding plate and the substrate and between the bonding plate and the fiber support assembly.

9. The optical waveguide assembly according to claim 8, wherein the bonding plate is disposed on a bottom face of the fiber support assembly.

10. The optical waveguide assembly according to claim 7, wherein the non-adhesive means comprises ultrasonic bonding.

11. The optical waveguide assembly according to claim 7, wherein the non-adhesive means comprises laser bonding.

12. A method of connecting an optical waveguide to an optical fiber support comprising:
   providing an optical waveguide having a substrate, wherein the substrate has a substrate face;

providing an optical fiber support having a support face;

applying a solvent to at least one of the support face and the substrate face; and monolithically bonding the support face and the substrate face through said solvent.

13. A method of connecting an optical waveguide to an optical fiber support comprising:

providing an optical waveguide having a substrate, wherein the substrate has a substrate face;

providing an optical fiber support having a support face;

providing a bonding plate having a first portion and a second portion;

applying non-adhesive means to at least one of the first portion and the substrate;

applying the non-adhesive means to at least one of the second portion and the support; and contacting the first portion to the substrate and contacting the second portion to the support such that the substrate face and the support face are contacting each other.

14. The method according to claim 13, wherein applying the non-adhesive means comprises applying a solvent.

15. The method according to claim 13, wherein applying the non-adhesive means comprises applying ultrasound.

16. The method according to claim 13, wherein applying the non-adhesive means comprises applying laser radiation.

* * * * *